(12) United States Patent
Moore et al.

(10) Patent No.: US 11,817,100 B2
(45) Date of Patent: Nov. 14, 2023

(54) SYSTEM FOR VOICE-TO-TEXT TAGGING FOR RICH TRANSCRIPTION OF HUMAN SPEECH

(71) Applicant: INTERNATIONAL BUSINESS MACHINES CORPORATION, Armonk, NY (US)

(72) Inventors: Robert John Moore, San Jose, CA (US); Shun Jiang, San Jose, CA (US); Chung-hao Tan, San Jose, CA (US); Eric Young Liu, Santa Clara, CA (US); Saurabh Mishra, San Jose, CA (US); Lei Huang, Mountain View, CA (US); Guangjie Ren, Belmont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 16/914,091

(22) Filed: Jun. 26, 2020

(65) Prior Publication Data
US 2021/0407512 A1    Dec. 30, 2021

(51) Int. Cl.
*G10L 15/26*    (2006.01)

(52) U.S. Cl.
CPC .................................. *G10L 15/26* (2013.01)

(58) Field of Classification Search
CPC ....................................................... G10L 15/26
See application file for complete search history.

(56) References Cited

U.S. PATENT DOCUMENTS

| 6,423,013 B1 * | 7/2002 | Bakker ..................... A61B 7/00 |
| | | 600/529 |
| 7,289,791 B2 | 10/2007 | Xie et al. |
| 8,335,689 B2 | 12/2012 | Wittenstein et al. |
| 8,554,348 B2 * | 10/2013 | Gehring .................. G10L 25/00 |
| | | 700/94 |
| 10,552,118 B2 | 2/2020 | Abuelsaad et al. |

(Continued)

FOREIGN PATENT DOCUMENTS

| CN | 105957517 A | 9/2016 |
| CN | 108122552 A | 6/2018 |

(Continued)

OTHER PUBLICATIONS

Mell, P. et al., "Recommendations of the National Institute of Standards and Technology"; NIST Special Publication 800-145 (2011); 7 pgs.

(Continued)

*Primary Examiner* — Ibrahim Siddo
(74) *Attorney, Agent, or Firm* — Intelletek Law Group, PLLC; Gabriel Daniel, Esq.

(57) ABSTRACT

A computer-implemented method of voice-to-text tagging for transcription of a human voice signal by one of an automatic speech recognition system, or a natural conversation, includes generating a speech-to-text verbal transcript of the verbal vocalizations of an audio signal at a verbal timestamp of the audio signal. A voice-to-text non-verbal transcript of the one or more non-verbal vocalizations of the audio signal is generated at a non-verbal timestamp of the audio signal. The non-verbal transcript and the verbal transcript are combined to generate an enhanced transcript.

20 Claims, 9 Drawing Sheets

(56) References Cited

U.S. PATENT DOCUMENTS

| | | | |
|---|---|---|---|
| 2006/0190256 A1* | 8/2006 | Stephanick | G06F 40/274 |
| | | | 704/E15.045 |
| 2011/0112821 A1* | 5/2011 | Basso | G06F 40/58 |
| | | | 704/2 |
| 2017/0278525 A1* | 9/2017 | Wang | G10L 25/84 |
| 2018/0113854 A1 | 4/2018 | Vig et al. | |

FOREIGN PATENT DOCUMENTS

| CN | 110070879 A | 7/2019 |
|---|---|---|
| CN | 110689877 A | 1/2020 |
| CN | 111276156 A | 6/2020 |

OTHER PUBLICATIONS

International Search Report and Written Opinion dated Sep. 8, 2021 in related application PCT/CN2021/099404.

* cited by examiner

SYSTEM FOR VOICE-TO-TEXT TAGGING FOR RICH TRANSCRIPTION OF HUMAN SPEECH

BACKGROUND

Technical Field

The present disclosure generally relates to automatic speech recognition systems, which convert human voice signals to text, and more particularly, it relates to the use of such systems in natural conversation systems in which humans interact with machines through natural language.

Description of the Related Art

Voice assistant systems provide services in a particular application through the use of automatic speech recognition, speech synthesis, and a natural language processing (NLP). Voice assistants are becoming ubiquitous in a wide-variety of applications, and there is an increased usage of Artificial Intelligence (AI) to recognize speech for NLP. However, voice assistants do not recognize nonverbal vocalizations that often accompany speech. Standard speech-to-text services only recognize words. Accordingly, automated agents that use speech-to-text services miss the full meaning of responses that include nonverbal vocalizations.

SUMMARY

According to one embodiment, a computer-implemented method of voice-to-text tagging for transcription of a human voice signal by one of an automatic speech recognition system or a natural conversation system, the method includes generating a speech-to-text verbal transcript of one or more verbal vocalizations of an audio signal at a verbal timestamp of the audio signal, and generating a voice-to-text non-verbal transcript of one or more non-verbal vocalizations of the audio signal at a non-verbal timestamp of the audio signal. The non-verbal transcript and the verbal transcript are combined to generate an enhanced transcript. The non-verbal transcript context can classify an output of the human vocal track, and describe how the speech was made, to provide a deeper understanding of the verbal transcript.

In one embodiment, there is a determining whether a quality of the non-verbal vocalizations of the audio signal include one or more of being sung, shouted, whispered, or uttered with a creaky voice. These non-verbal vocalizations can advantageously provide an indication of the state of mind of the speaker, and for example, in the case of a whisper, that the speaker considers the information to be sensitive.

In one embodiment, there is a classifying of the audio signal into one or more time segments that each include a respective portion of the non-verbal vocalizations and the verbal vocalizations. The generating of the non-verbal transcript includes identifying each of the non-verbal vocalizations and an associated time segment of the one or more time segments, and the generating of the verbal transcript includes identifying each of the verbal vocalizations and an associated time segment of the one or more time segments.

In one embodiment, there is a sub-classifying of the non-verbal vocalizations into one or more vocalization groups.

In one embodiment, the one or more vocalization groups include at least one of a pre-verbal, a breathy, a guttural, a fricative, or a click.

In one embodiment, the generating of the verbal transcript of the one or more verbal vocalizations and the generating of the non-verbal transcript of the one or more non-verbal vocalizations are based on an overlapping time segment of the audio signal. An advantage of using non-verbalizations while the speech is occurring permits modifying the meaning of the speech as being, for example, skeptical, sarcastic, angry, frustrated, etc.

In one embodiment, the generating of the verbal transcript of the one or more verbal vocalizations and the generating of the non-verbal transcript of the one or more non-verbal vocalizations are based on consecutive time segments of the audio signal. An advantage of the consecutive time segments is that the non-verbal transcript can convey an additional meaning, or modify the speech as an afterthought.

In one embodiment, a computer-implemented method of voice-to-text tagging for transcription of a natural language conversation includes training of a vocalization classifier with a training set of a plurality of voice-to-text non-verbal vocalizations. One or more time segments of an audio signal are classified into one or more non-verbal vocalizations. A voice-to-text non-verbal transcript is generated that indicates an occurrence of the one or more non-verbal vocalizations based on the nonverbal timestamp, and the speech-to-text verbal transcript that indicates an occurrence of the verbal vocalizations is generated based on the verbal timestamp. An enhanced transcript is generated by combining the voice-to-text transcript of the non-verbal vocalizations with the speech-to-text transcript of the verbal vocalizations classified by a natural language classifier. The advantage of training a vocalization classifier includes the ability to update the recognition of non-verbal cues that accompany, or follow a conversation.

In one embodiment, a video-to-text generates a transcript of a video of a subject's verbal vocalizations and non-verbal vocalizations, and the video-to-text transcript is combined with the speech-to-text and voice-to-text. The voice-to-text, for example, can include facial expressions, hand gestures, etc. which can provide a deeper and more accurate meaning of the speech.

In one embodiment, a non-transitory computer-readable storage medium tangibly embodying a computer-readable program code having computer-readable instructions that, when executed, causes a computer device to perform a method of voice-to-text tagging for transcription of a natural language conversation. The method includes generating a speech-to-text verbal transcript of the verbal vocalizations of an audio signal at a verbal timestamp of the audio signal. A voice-to-text non-verbal transcript is generated from the one or more non-verbal vocalizations of the audio signal at a non-verbal timestamp of the audio signal. The voice-to-text non-verbal transcript and the speech-to-text verbal transcript are combined to generate an enhanced transcript based on the nonverbal timestamp and the nonverbal timestamp.

In one embodiment, a voice-to-text tagging device includes a processor, and a memory is coupled to the processor. The memory stores instructions to cause the processor to perform acts including the classifying of one or more time segments of an audio signal into one or more verbal vocalizations and one or more non-verbal vocalizations. There is also a classifying and converting of the verbal vocalizations by a natural language classier into a speech-to-text transcript, and a classifying and converting of the non-verbal vocalizations into a voice-to-text transcript. The speech-to-text-transcript and the voice-to-text transcript for each time segment of the audio signal are combined into an enhanced transcript, and the combined speech-to-text-format and the voice-to-text format are output. The accuracy of voice assistants using such configurations can provide an enhanced or more accurate meaning of converted speech.

In one embodiment, a microphone is coupled to the memory and the processor, the microphone is configured for receiving a sound input and generating the audio signal.

In one embodiment, a camera is coupled to the memory and the processor, the camera is configured for receiving a video input, wherein the processor is configured to generate a video-to-text transcription for combination with the speech-to-text and voice-to-text.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview and Advantages

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

The present disclosure provides a computer-implemented method and device for capturing and classifying nonverbal vocalizations, or sounds that can be produced by the human vocal tract but are not words. Current Artificial Intelligence (AI) voice assistants fail to recognize non-verbal vocalizations, yet such vocalizations are routinely consequential in natural human conversation and provide a deeper understanding of the meaning of the spoken words and speaker intention. The automated agents utilizing speech-to-text services typically only recognize spoken words. Accordingly, such automated agents that rely on speech-to-text services can miss many of the meaningful responses or nuances of verbal responses by users.

For example, laughter can show understanding and joy. Alternatively, laughter can follow a sarcastic comment. Scoffing can signal disapproval; sighing can express defeat; shouting can indicate aggression; whispering can identify a sensitive topic without actually saying that the topic is sensitive; and the like.

According to the present disclosure, a voice-to-text classifier receives the non-verbal vocalizations of an audio signal, generates a non-verbal transcript with timestamps for each annotation. In an embodiment, there are sub-classes of non-verbal vocalizations that will be output as a voice-to-text transcription that enhance the output of a speech-to-text time-based segment of the audio signal.

The voice-to-text tagging of transcription of a natural conversation according to the present disclosure provides an improvement in fields such as automatic speech recognition and natural language processing, and provides a more dynamic and intuitive understanding than conventional speech-to-text systems. The non-verbal communication, which can be converted to a voice-to-text format, enhances the understanding of the speech to text. In addition, the computer-implemented system and method provide for an improvement in the efficiency of computer operations. For example, by virtue of the teachings herein, there are more accurate responses, to natural language inputs, which in turn reduces the use of computer processing and storage, as there will be fewer retries and follow-up inquiries in an attempt to hone an understanding of an audio file of a speech-to-text system.

It is to be understood that although in several embodiments the computer-implemented method and device according to the present disclosure is applied to a natural conversation system, the teachings are applicable to any automatic speech recognition system.

Example Architecture

Figure 1:
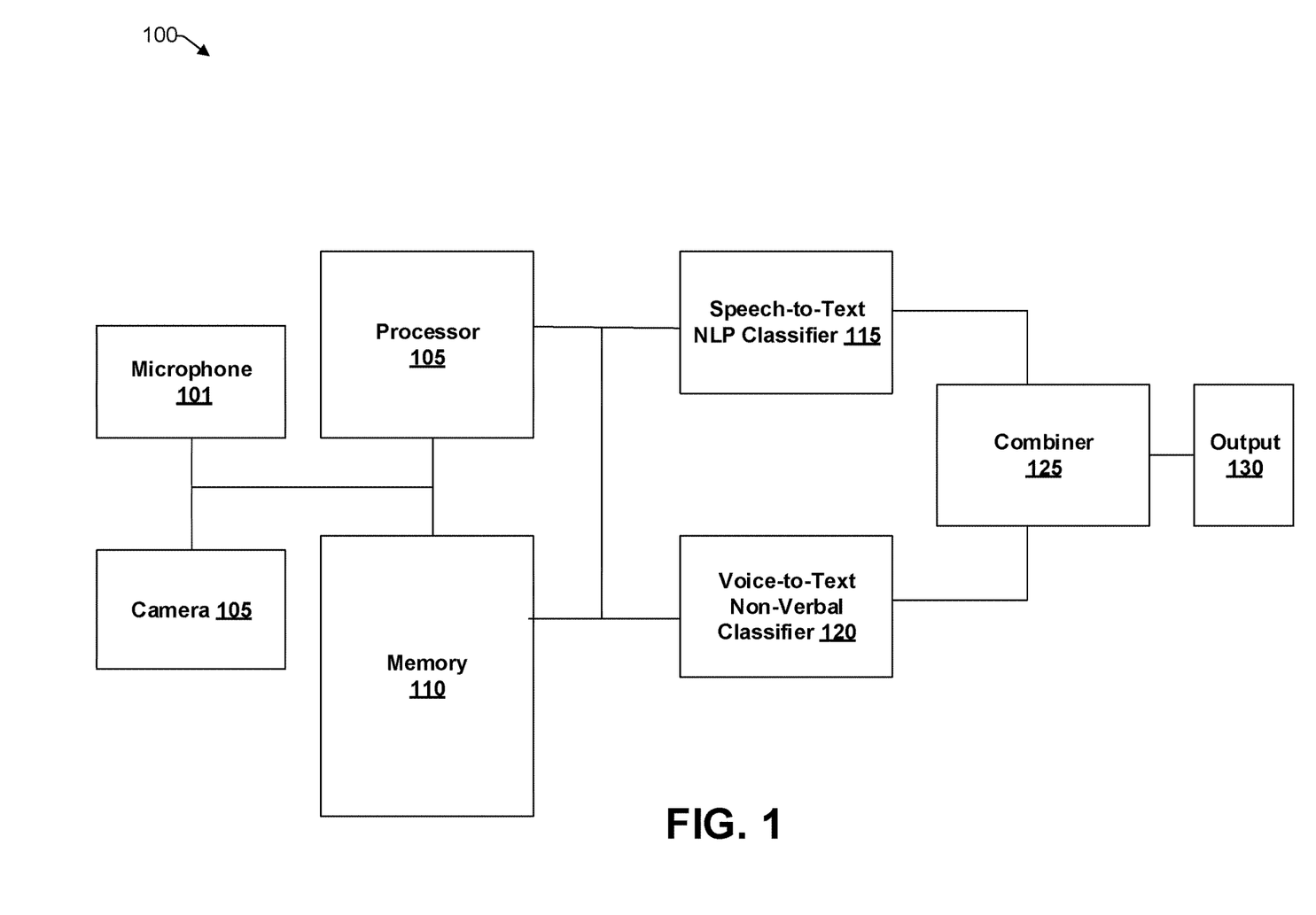
FIG. 1 is a block diagram providing an overview of an architecture for voice-to-text tagging for transcription of a natural language conversation, consistent with an illustrative embodiment.

FIG. 1 is a diagram providing an overview of an architecture 100 for voice-to-text tagging for transcription of a natural language conversation, consistent with an illustrative embodiment. For example, FIG. 1 shows a device including a processor 105 and a memory 110 coupled to the processor 105. While in FIG. 1, there s shown two input devices (e.g., a microphone 101 and a camera 105), it is to be understood that there can be a single input, such as the microphone 101. An audio signal may be processed by the processor 105 so that the verbal vocalizations (e.g. speech) are provided to a speech-to-text natural language classifier 115 for conversion to a speech-to-text format, and the non-verbal vocalizations are provided to a voice-to-text non-verbal classifier 120 for a conversion to a voice-to-text format.

Each of the outputs from the speech-to-text classifier 115 and the voice-to-text classifier 120 includes at least one timestamp that identifies the portion of the time-based segment that includes the converted speech-to-text classifier 115 and the converted voice-to-text classifier 120. The audio signal may be divided into one or more time-based segments. The combiner 125 receives both the speech-to-text and the voice-to-text formats and, for example, can combine their display to concurrently display the speech-to-text and the voice-to-text. There may be a display of combined information based on one or more time-based segments of the audio signal (see FIG. 3), The output 130 may be transmission of a display, or transmitted to a storage, or another device, etc. The enhanced transcript can provide a more accurate meaning as the non-verbal vocalizations in the enhanced transcript can modify the converted speech-to-text.

Figure 2:
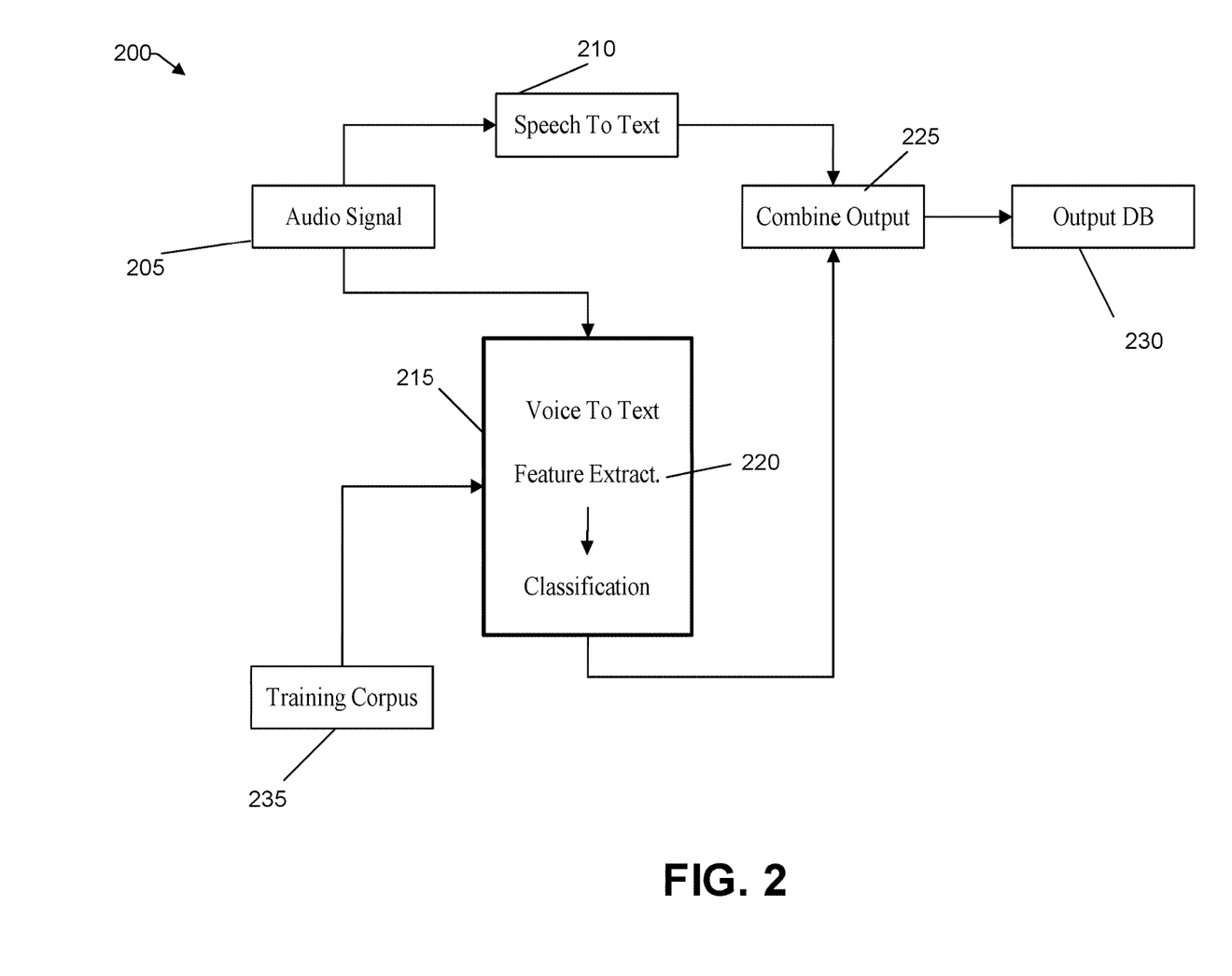
FIG. 2 is a flow diagram of a processing of an audio signal including verbal and non-verbal vocalizations, consistent with an illustrative embodiment.

FIG. 2 shows a flow diagram 200 of the processing of an audio signal including verbal and non-verbal vocalizations, consistent with an illustrative embodiment. An audio signal 205 can be provided for a speech-to-text processing 210 and for a voice-text-processing 215. For example, feature extraction 220, or a filtration, can be used to provide the particular portion of the audio signal for conversion. Alternatively, the audio signal can be divided by a splitter and for speech to text and voice to text conversion. The audio signal may be classified into one or more time-based segments of non-verbal vocalizations and verbal vocalizations, respectively. The output of the speech to text classifier 210 and the voice-to-text 215 may be combined for an output 225 that is provided to an output 230 for display or transmission. FIG. 2 also shows a training corpus 235 (e.g., a training set), so that machine learning, deep learning, can be used to teach or update the voice-to-text operations of the present disclosure.

Figure 3:
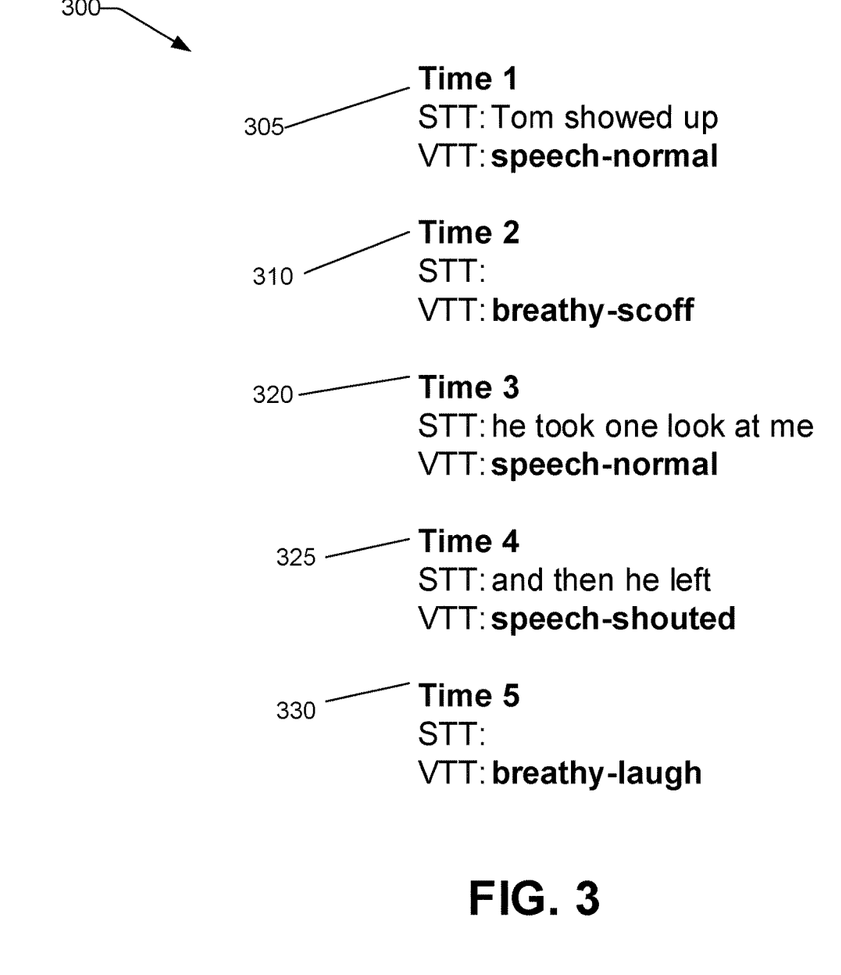
FIG. 3 illustrates time-based segments of speech-to-text enhanced with voice-to-text, consistent with an illustrative embodiment.

FIG. 3 is an example of a combined output 300 of a voice-to-text and a speech-to-text according to an illustrative embodiment. FIG. 3 shows an enriched display that provides the non-verbal vocalizations as part of the display. Displaying the enhanced transcript, as discussed above can provide for a more accurate understanding of the speech.

For example, at time 1 at 305 the speech-to-text (e.g. "Tom showed up") has a voice-to-text enhancement that is "speech-normal." In this case, the speech-to-text is spoken in a normal speaking volume.

At time 2 (310), there is not any speech-to-text, but there is a breathy-scoff, which may be a modifier of the "Tom showed Up." The breathy-scoff can have two additional items to understand regarding the text, as a scoff (e.g. scoffing) can signal disapproval that Tom showed up. Time 3 (320) again indicates a normal speech and tone. However, at time 4 (325), the voice-to-text indicates that some speech was shouted. Standard speech-to-text captures the actual words that were shouted. In this case, the shouting of the utterance indicates shock. At time 5 (330), the breathy-laugh responds to the speech utterance from time 4 in a way that shows understanding and amusement. Time-based segments 3, 4, and 5 are linked as it is stated in the text that "he took one look at me," followed by shouting "and then he left," and then a breathy-laugh. Thus, the combined output of FIG. 3 provides enhanced information by providing a transcript of the non-verbal text associated with the speech.

Figure 4:
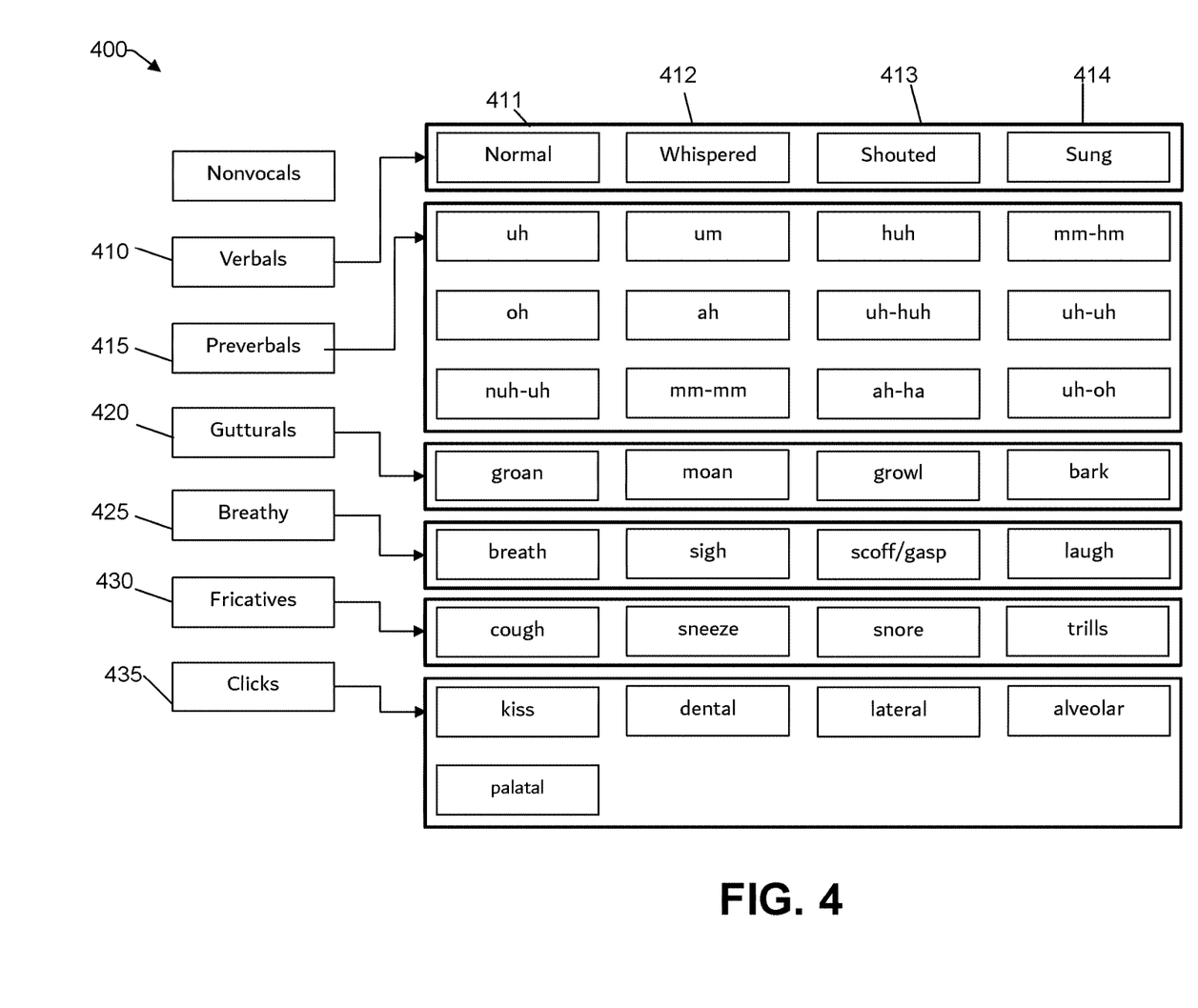
FIG. 4 illustrates classifications of vocalizations, consistent with an illustrative embodiment.

FIG. 4 illustrates classifications 400 of vocalizations, consistent with an illustrative embodiment. For example, at 410 there is shown a verbals class 410, which include sub-classes of normal 411, whispered 412, shouted 413, and sung 414.

Other classifications in addition to the verbals class 410 includes pre-verbals 415, gutturals 420, breathy sounds 425, fricatives 430, and clicks 435. Examples of subclasses of each classification is also shown. A display of the classification type, and the sub-classification of terms can provide a deeper understanding of the speech-to-text.

Figure 5:
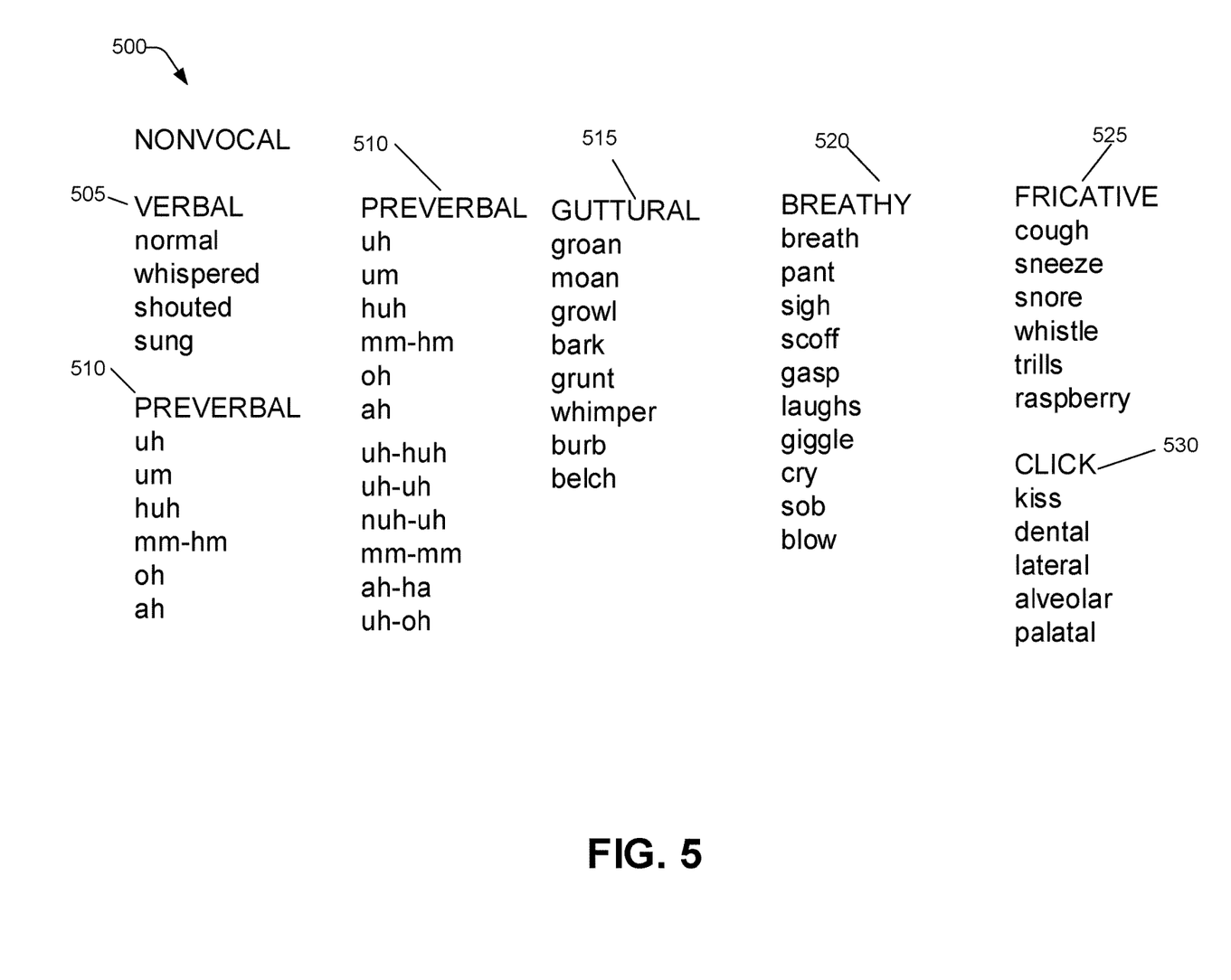
FIG. 5 provides example lists of non-verbal vocalizations, consistent with an illustrative embodiment.

FIG. 5 is an illustration of lists 500 of non-verbal vocalizations, consistent with an illustrative embodiment. A person of ordinary skill in the art should understand and appreciate that the appended claims are not limited to the non-verbal vocalizations shown and described herein, and the computer-implemented method can be applied to virtually any sound of the human vocal tract. There is shown a list of properties of verbal vocalizations, e.g., normal, whispered, shouted, sung, as discussed above that are non-exhaustive and provided for illustrative purposes. The pre-verbals 510 are vowel-like vocalization that are usually not words but are used like words, such as "uh-huh" for affirmation or continuation, "nuh-uh" for disaffirmation, "oh" for surprise, "uh-oh" for concern, "ah-ha" for discovery, etc. The gutturals 515 are vocalizations articulated in the throat near the soft palate, such as moans, groans, growls, etc. The breathy sounds 520 are kinds of audible exhalations, which may include articulations at the glottis, such as sighs, gasps, laughs, sobs, etc. Fricative 525 sounds are made by the frictional passage of air through a narrow point in the human vocal tract, such as coughs, sneezes, snores, etc. Click 530 sounds which are sounds made by trapping air between two articulations of the human vocal tract and releasing it, such as kisses, lateral clicks to tell a horse to "giddyup," etc. All of the above vocalizations can aide in a deeper understanding of the speech-to-text.

Example Process

Figure 6:
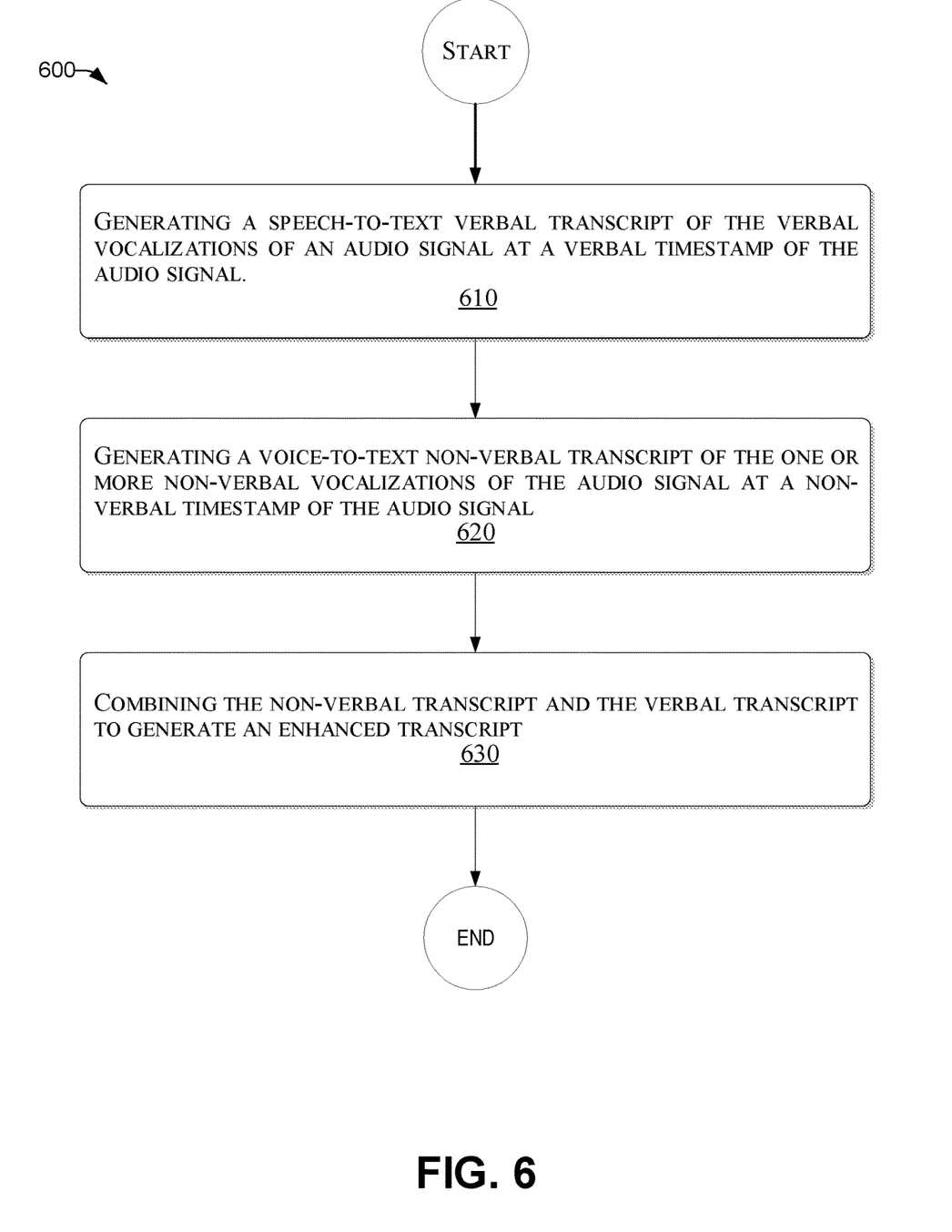
FIG. 6 is a flowchart of a computer-implemented method of voice-to-text tagging for transcription of a natural language conversation, consistent with an illustrative embodiment.

With the foregoing overview of the example architecture, it may be helpful now to consider a high-level discussion of an example process. To that end, in conjunction with FIGS. 1 and 2, FIG. 6 illustrates a flowchart of a method of voice-to-text tagging for transcription of a natural conversation, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 600 is described with reference to the architecture of FIGS. 1 and 2.

At operation 610, a speech-to-text verbal transcript of the verbal vocalizations of an audio signal is generated at a verbal timestamp of the audio signal.

At operation 620, a voice-to-text non-verbal transcript of the one or more non-verbal vocalizations of the audio signal is generated at a non-verbal timestamp of the audio signal. According to the present disclosure, the voice-to-text enhances the understanding of the speech-to-text by including non-verbal information associated with the speech. For example, the words may be been spoken followed by laughter, shouted (e.g., aggression), or whispered (e.g., private).

At operation 630, the output of the non-verbal transcript and the verbal transcript are combined at the nonverbal timestamp and the non-verbal timestamp to generate an enhanced transcript. In other words, for a given time-based segment of the audio file, both the speech-to-text and the voice-to-text are both displayed as an output.

The process in this illustrative embodiment ends after operation 630.

Example Particularly Configured Computing Device

Figure 7:
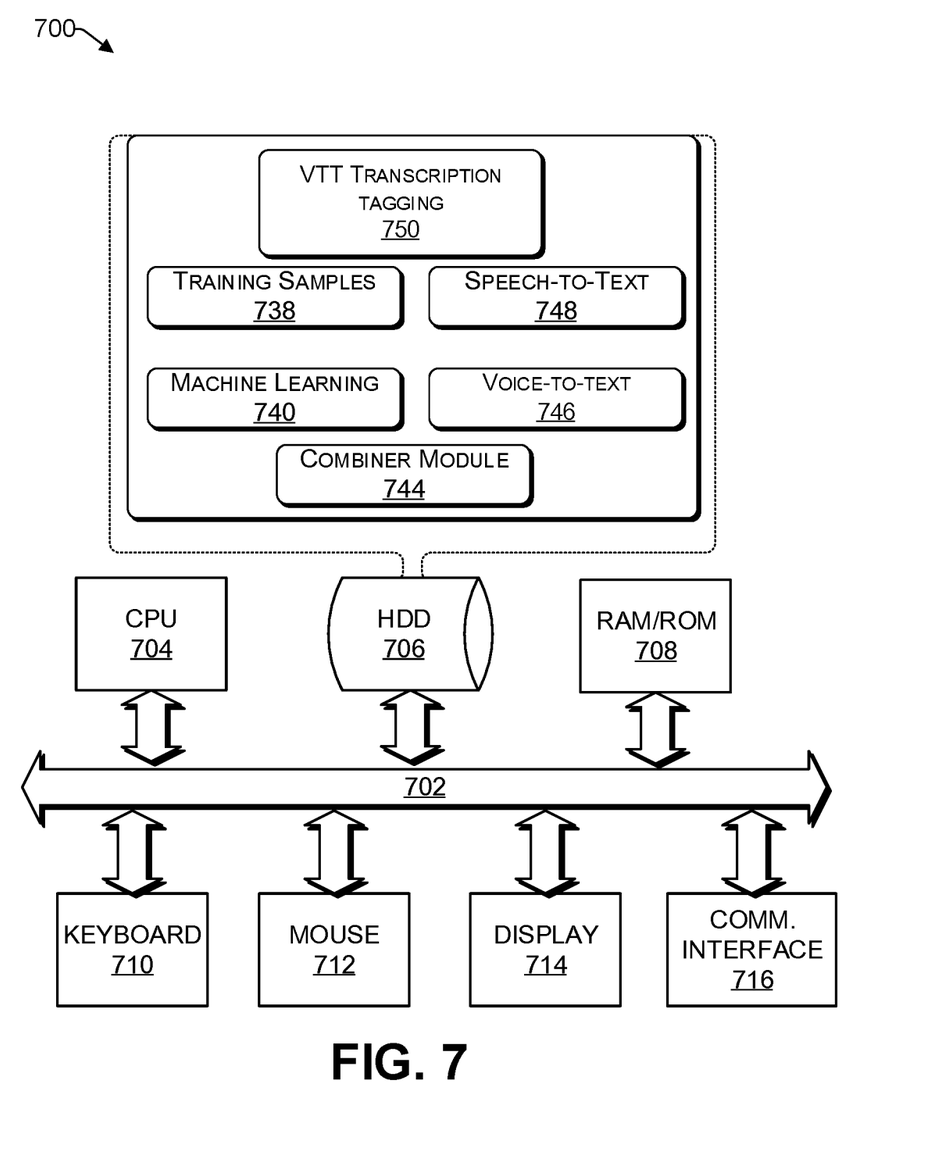
FIG. 7 is a functional block diagram of a particularly configured computer hardware platform that can communicate with various networked components, consistent with an illustrative embodiment.

FIG. 7 provides a functional block diagram illustration 700 of a computer hardware platform. In particular, FIG. 7 illustrates a particularly configured network or host computer platform 700, as may be used to implement the method as discussed herein above.

The computer platform 700 may include a central processing unit (CPU) 704, a hard disk drive (HDD) 706, random access memory (RAM) and/or read-only memory (ROM) 708, a keyboard 710, a mouse 712, a display 714, and a communication interface 716, which are connected to a system bus 702. The HDD 706 can include data stores.

In one embodiment, the HDD 706, has capabilities that include storing a program that can execute various processes, such as for executing voice-to-text transcription tagging 750, in a manner described herein. The voice-to-text transcription tagging 750 includes a plurality of training samples 738, a machine learning module 740, that are used to train the device via deep learning. Voice-to-text 746 and speech-to-text 746 modules provide a conversion of different parts of the audio signal. A combiner module 744 combines the speech-to-text and the voice-to-text, for example, in a common display. There can be various modules configured to perform different functions that can vary in quantity.

For example, a training sample module 738 stores various data to train the conversational workspace 748 via a machine learning module 740 configured to perform machine learning regarding utterances, and learning the intent of new or updated utterances.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

Example Cloud Platform

Figure 8:
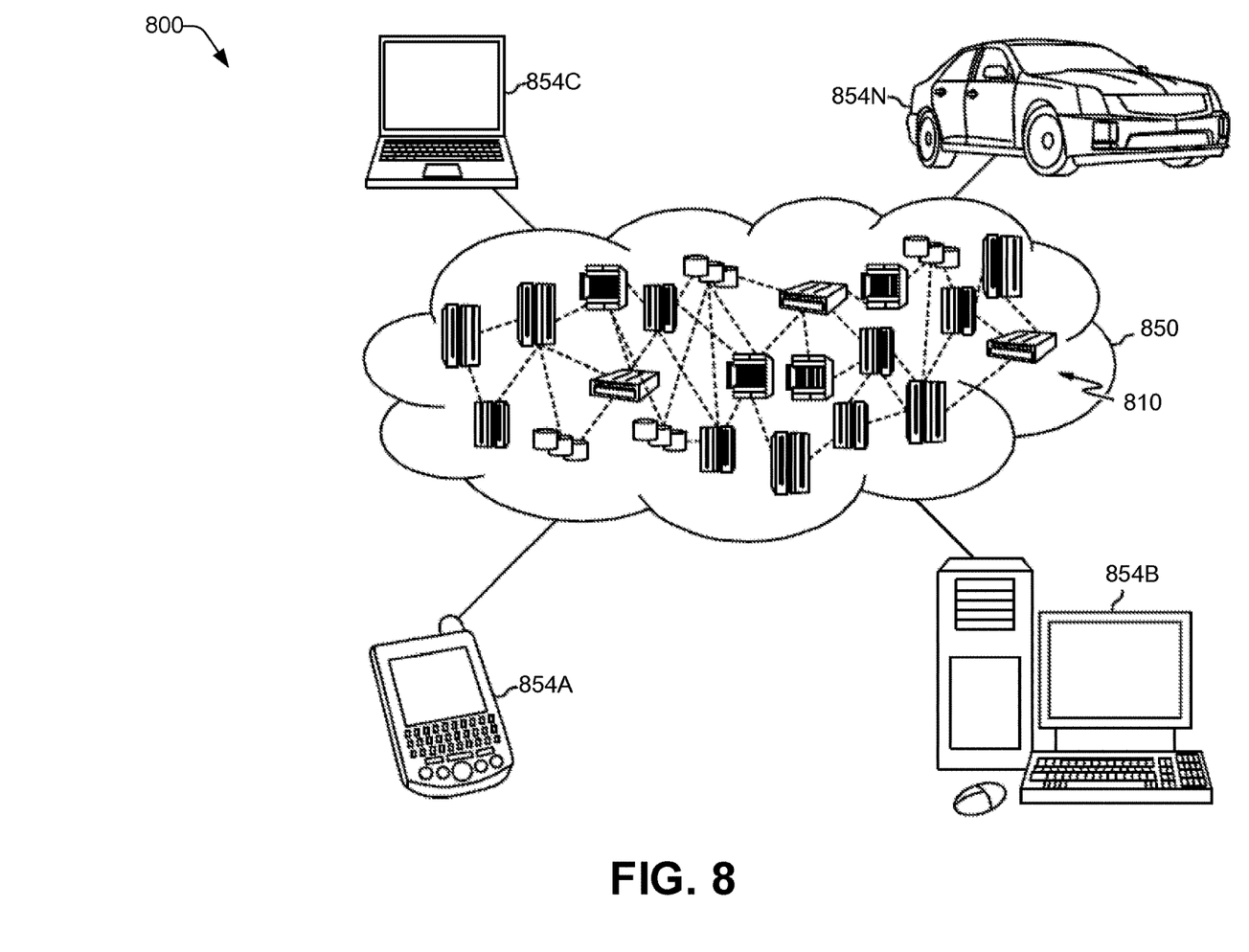
FIG. 8 depicts an illustrative cloud computing environment utilizing cloud computing.

As discussed above, functions relating to environmental and ecological optimization methods may include a cloud 850 (see FIG. 8). It is to be understood that although this disclosure includes a detailed description of cloud computing as discussed hereinbelow, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 8, an illustrative cloud computing environment 700 utilizing cloud computing is depicted. As shown, cloud computing environment 700 includes cloud 700 having one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms, and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
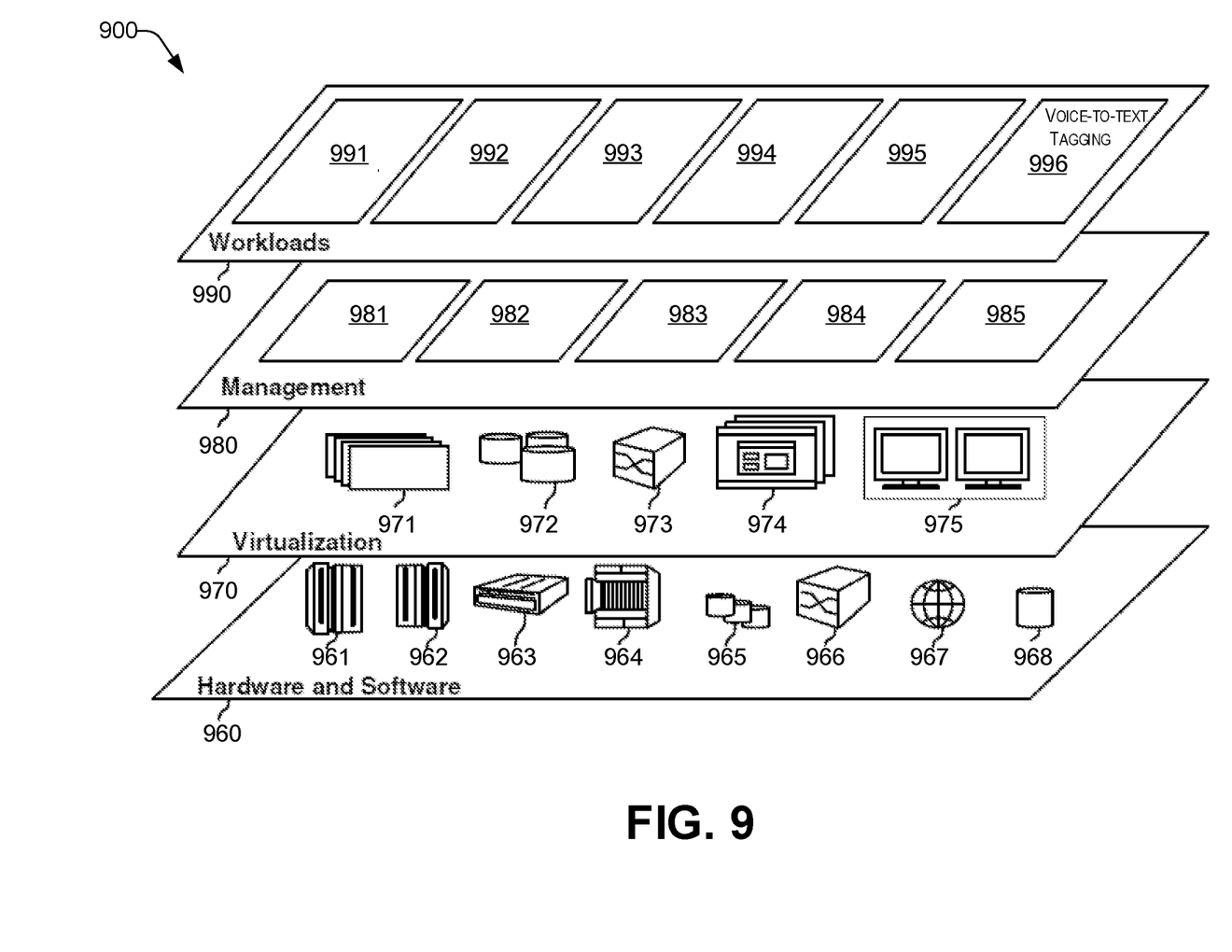
FIG. 9 depicts a set of functional abstraction layers provided by a cloud computing environment.

Referring now to FIG. 9, a set of functional abstraction layers provided by cloud computing environment 800 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 960 include hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and a voice-to-text tagging module 996, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of voice-to-text tagging for transcription of a human voice signal by one of an automatic speech recognition system or a natural conversation system, the method comprising:
   dividing an audio signal of a human vocal tract into one or more time-based segments based on non-verbal vocalizations and verbal vocalizations, wherein non-verbal vocalizations are sounds that can be produced by a human vocal tract but are not words;
   generating a speech-to-text verbal transcript of one or more verbal vocalizations of the audio signal at a verbal timestamp of the audio signal;
   generating a voice-to-text non-verbal transcript of one or more non-verbal vocalizations of the audio signal at a non-verbal timestamp of the audio signal;
   determining a state of mind of the human from the non-verbal transcript; and
   generating an enhanced transcript including a meaning of the verbal transcript based on the non-verbal transcript by combining the non-verbal transcript and the verbal transcript.

2. The computer-implemented method of claim 1, further comprising determining whether a quality of the verbal vocalizations of the audio signal comprise at least one of being sung, shouted, whispered, or uttered with a creaky voice.

3. The computer-implemented method of claim 1, further comprising:
   classifying the audio signal into one or more time segments that each include a respective portion of the non-verbal vocalizations and the verbal vocalizations, wherein:
      the generating of the non-verbal transcript includes identifying each of the non-verbal vocalizations and an associated time segment of the one or more time segments, and
      the generating of the verbal transcript includes identifying each of the verbal vocalizations and an associated time segment of the one or more time segments.

4. The computer-implemented method of claim 3, further comprising sub-classifying the non-verbal vocalizations into one or more vocalization groups.

5. The computer-implemented method of claim 4, wherein the plurality of vocalization groups comprise at least one of a pre-verbal, a guttural, a breathy, a fricative, or a click.

6. The computer-implemented method of claim 1, wherein the generating of the verbal transcript of the one or more verbal vocalizations and the generating of the non-verbal transcript of the one or more non-verbal vocalizations are based on an overlapping time segment of the audio signal.

7. The computer-implemented method of claim 1, wherein the generating of the verbal transcript of the one or more verbal vocalizations and the generating of the non-verbal transcript of the one or more non-verbal vocalizations are based on consecutive time segments of the one or more time segments of the audio signal.

8. The computer-implemented method of claim 1, further comprising:
   generating a video-to-text transcript of a video of a subject speaking the verbal vocalizations and the non-verbal vocalizations; and
   combining the video-to-text transcript with at least one of the speech-to-text transcript and the voice-to-text transcript.

9. A computer-implemented method of voice-to-text tagging for transcription of a natural conversation, the method comprising:
   training a vocalization classifier with a training set of a plurality of voice-to-text non-verbal vocalizations;
   dividing an audio signal of a human vocal tract into one or more time-based segments based on non-verbal vocalizations and verbal vocalizations, wherein non-verbal vocalizations are sounds that can be produced by a human vocal tract but are not a words;
   classifying the one or more non-verbal vocalizations according to the time-based segments of the audio signal, respectively;
   generating a voice-to-text non-verbal transcript indicating an occurrence of one or more of the non-verbal vocalizations;
   generating a speech-to-text verbal transcript indicating an occurrence of the verbal vocalizations based on a verbal timestamp;
   determining a state of mind of the human from the non-verbal transcript; and
   generating an enhanced transcript including a meaning of the verbal transcript based on the non-verbal transcript by combining an output of the voice-to-text transcript of the non-verbal vocalizations of the audio signal with an output of the speech-to-text transcript of the verbal vocalizations, wherein the verbal vocalizations are classified by a natural language classifier.

10. The computer-implemented method of claim 9, further comprising sub-classifying the non-verbal vocalizations in a plurality of vocalization groups comprising at least one of a preverbal, a guttural, a breathy, a fricative, or a click.

11. The computer-implemented method of claim 9, wherein the combining of the voice-to-text transcript and the speech-to-text transcript includes: displaying of a voice-to-text description of the non-verbal vocalizations for each time segment of the audio signal.

12. The computer-implemented method of claim 11, wherein the combining of the output the voice-to-text transcript and the speech-to-text transcript includes a displaying of the voice-to-text description for an associated speech-to-text display for at least one time segment of the audio signal.

13. The computer-implemented method of claim 9, further comprising generating a video-to-text transcript of a video of a subject speaking the verbal vocalizations and the non-verbal vocalizations, and combining the video-to-text transcript with at least one of the speech-to-text transcript and the voice-to-text transcript.

14. A non-transitory computer-readable storage medium tangibly embodying a computer-readable program code having computer-readable instructions that, when executed, causes a computer device to perform a method of voice-to-text tagging for transcription of a natural conversation, the method comprising:
- dividing an audio signal of a human vocal tract into one or more time-based segments based on non-verbal vocalizations and verbal vocalizations, wherein non-verbal vocalizations are sounds that can be produced by a human vocal tract but are not a words;
- generating a speech-to-text verbal transcript of the verbal vocalizations of the audio signal at a verbal timestamp of the audio signal;
- generating a voice-to-text non-verbal transcript of the one or more non-verbal vocalizations of the audio signal at a non-verbal timestamp of the audio signal;
- determining a state of mind of the human from the non-verbal transcript; and
- combining the non-verbal transcript and the verbal transcript at the nonverbal timestamp and the nonverbal timestamp to generate an enhanced transcript including a meaning of the verbal transcript based on the non-verbal transcript.

15. The computer-readable storage medium according to claim 14, the method further comprising determining whether the verbal vocalizations of the audio signal comprise at least one of being sung, shouted, whispered, or uttered with a creaky voice.

16. The computer-readable storage medium according to claim 14, the method further comprising:
classifying the audio signal into one or more time segments of the non-verbal vocalizations and the verbal vocalizations, respectively.

17. The computer-readable storage medium according to claim 16, wherein the method further comprises sub-classifying the non-verbal vocalizations into one or more vocalization groups comprising at least one of a pre-verbal, a guttural, a breathy, a fricative, or a click.

18. A voice-to-text tagging device comprising:
- a processor;
- a memory coupled to the processor, the memory storing instructions to cause the processor to perform acts comprising:
- dividing an audio signal of a human vocal tract into one or more time-based segments based on non-verbal vocalizations and verbal vocalizations, wherein non-verbal vocalizations are sounds that can be produced by a human vocal tract but are not a words;
- classifying the one or more time-based segments of the audio signal into one or more verbal vocalizations and one or more non-verbal vocalizations;
- classifying and converting the verbal vocalizations from a natural language classifier into a verbal transcript having a speech-to-text format;
- classifying and converting the non-verbal vocalizations into a non-verbal transcript having a voice-to-text format;
- determining a state of mind of the human from the non-verbal transcript;
- generating an enhanced transcript by combining the speech-to-text-transcript and the voice-to-text transcript including a meaning of the verbal transcript based on the non-verbal transcript for each time segment of the audio signal; and
- outputting the combined speech-to-text-transcript and the voice-to-text transcript.

19. The device according to claim 18, further comprising a microphone coupled to the memory and the processor, the microphone is configured for receiving a sound input and generating the audio signal.

20. The device according to claim 19, further comprising a camera coupled to the memory and the processor, the camera is configured for receiving a video input, wherein the processor is configured to generate a video-to-text transcript for combination with the speech-to-text transcript and the voice-to-text transcript.

* * * * *